US010634428B1

(12) United States Patent
Peter

(10) Patent No.: US 10,634,428 B1
(45) Date of Patent: Apr. 28, 2020

(54) ENVIRONMENTALLY SENSITIVE CONTAINER ASSEMBLY

(71) Applicant: Tommy Peter, Inglewood, CA (US)

(72) Inventor: Tommy Peter, Inglewood, CA (US)

( * ) Notice: Subject to any disclaimer, the term of this patent is extended or adjusted under 35 U.S.C. 154(b) by 14 days.

(21) Appl. No.: 16/162,432

(22) Filed: Oct. 17, 2018

(51) Int. Cl.
*F26B 9/00* (2006.01)
*F26B 25/08* (2006.01)
*F26B 25/22* (2006.01)
*F26B 21/08* (2006.01)
*A24F 25/00* (2006.01)
*G01N 19/10* (2006.01)
*B65D 43/02* (2006.01)
*F26B 9/06* (2006.01)

(52) U.S. Cl.
CPC .............. *F26B 9/003* (2013.01); *F26B 25/08* (2013.01); *F26B 25/22* (2013.01); *A24F 25/00* (2013.01); *B65D 43/0225* (2013.01); *B65D 2543/00092* (2013.01); *F26B 9/06* (2013.01); *F26B 21/08* (2013.01); *G01N 19/10* (2013.01)

(58) Field of Classification Search
CPC .......... F26B 9/003; F26B 25/08; F26B 25/22; F26B 9/06; F26B 21/08; G01N 19/10; B65D 43/0225; B65D 2543/00092; A24F 25/00
USPC ......................................................... 34/195
See application file for complete search history.

(56) References Cited

U.S. PATENT DOCUMENTS

| 1,576,272 | A |   | 3/1926  | Goldsmith |
| 2,019,222 | A |   | 10/1935 | Hastings |
| 2,020,081 | A |   | 11/1935 | Schoew |
| 3,972,674 | A | * | 8/1976  | Harrell ..................... A24B 1/02 34/233 |
| 4,136,550 | A |   | 1/1979  | Pott |
| 4,470,422 | A | * | 9/1984  | Joubert ..................... A24B 1/02 131/302 |
| 4,790,335 | A | * | 12/1988 | Marley ..................... A24B 1/02 131/304 |
| 10,124,941 | B2 | * | 11/2018 | Sibley ..................... B65B 29/00 |
| 10,422,579 | B2 | * | 9/2019  | Kozlowski .............. F26B 21/10 |
| 2006/0286606 | A1 | * | 12/2006 | Oliver .................. G01N 1/2214 435/7.1 |
| 2014/0166509 | A1 |   | 6/2014  | Chung |
| 2015/0007441 | A1 |   | 1/2015  | Lee |
| 2015/0096189 | A1 | * | 4/2015  | Hawes .................... F26B 21/08 34/474 |
| 2017/0094920 | A1 | * | 4/2017  | Ellins ..................... A01G 31/02 |

(Continued)

FOREIGN PATENT DOCUMENTS

| CA |     | 2963870 A1 | * | 5/2016  | ............. B65B 29/00 |
| WO | WO-2018204337 A1 | * | 11/2018 | ............. F26B 21/08 |

*Primary Examiner* — Stephen M Gravini

(57) ABSTRACT

An environmentally sensitive container assembly for curing cannabis includes a jar that has cannabis positioned therein for the purposes of curing the cannabis. A disk is positionable on the jar for closing the jar. A humidistat is coupled to the disk to detect humidity levels in the jar. A thermometer is coupled to the disk to detect a temperature in the jar. A display is coupled to the disk, the display displays temperature indicia for communicating the temperature in the interior of the jar and the display displays humidity indicia for communication the humidity in the interior of the jar. A lid is removably coupled to the jar and compresses the disk against the jar to close the jar.

8 Claims, 4 Drawing Sheets

(56) References Cited

U.S. PATENT DOCUMENTS

2017/0112181 A1* 4/2017 Belfance ................ B65D 81/22
2018/0313606 A1* 11/2018 Perna ........................ F26B 9/06

* cited by examiner

ENVIRONMENTALLY SENSITIVE CONTAINER ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to container devices and more particularly pertains to a new container device for storing and curing cannabis.

BRIEF SUMMARY OF THE INVENTION

An embodiment of the disclosure meets the needs presented above by generally comprising a jar that has cannabis positioned therein for the purposes of curing the cannabis. A disk is positionable on the jar for closing the jar. A humidistat is coupled to the disk to detect humidity levels in the jar. A thermometer is coupled to the disk to detect a temperature in the jar. A display is coupled to the disk, the display displays temperature indicia for communicating the temperature in the interior of the jar and the display displays humidity indicia for communication the humidity in the interior of the jar. A lid is removably coupled to the jar and compresses the disk against the jar to close the jar.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
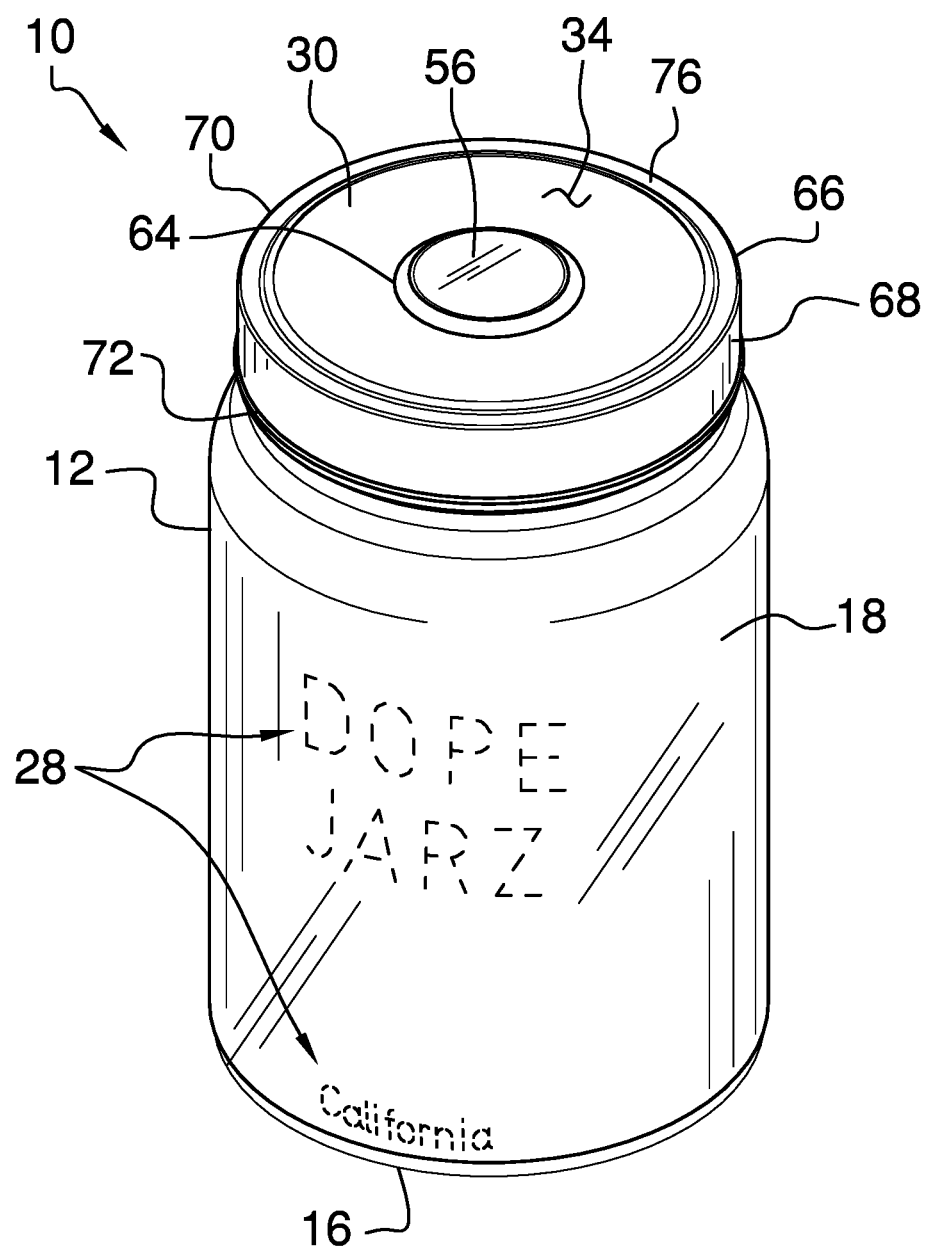
FIG. 1 is a perspective view of an environmentally sensitive container assembly according to an embodiment of the disclosure.
Figure 2:
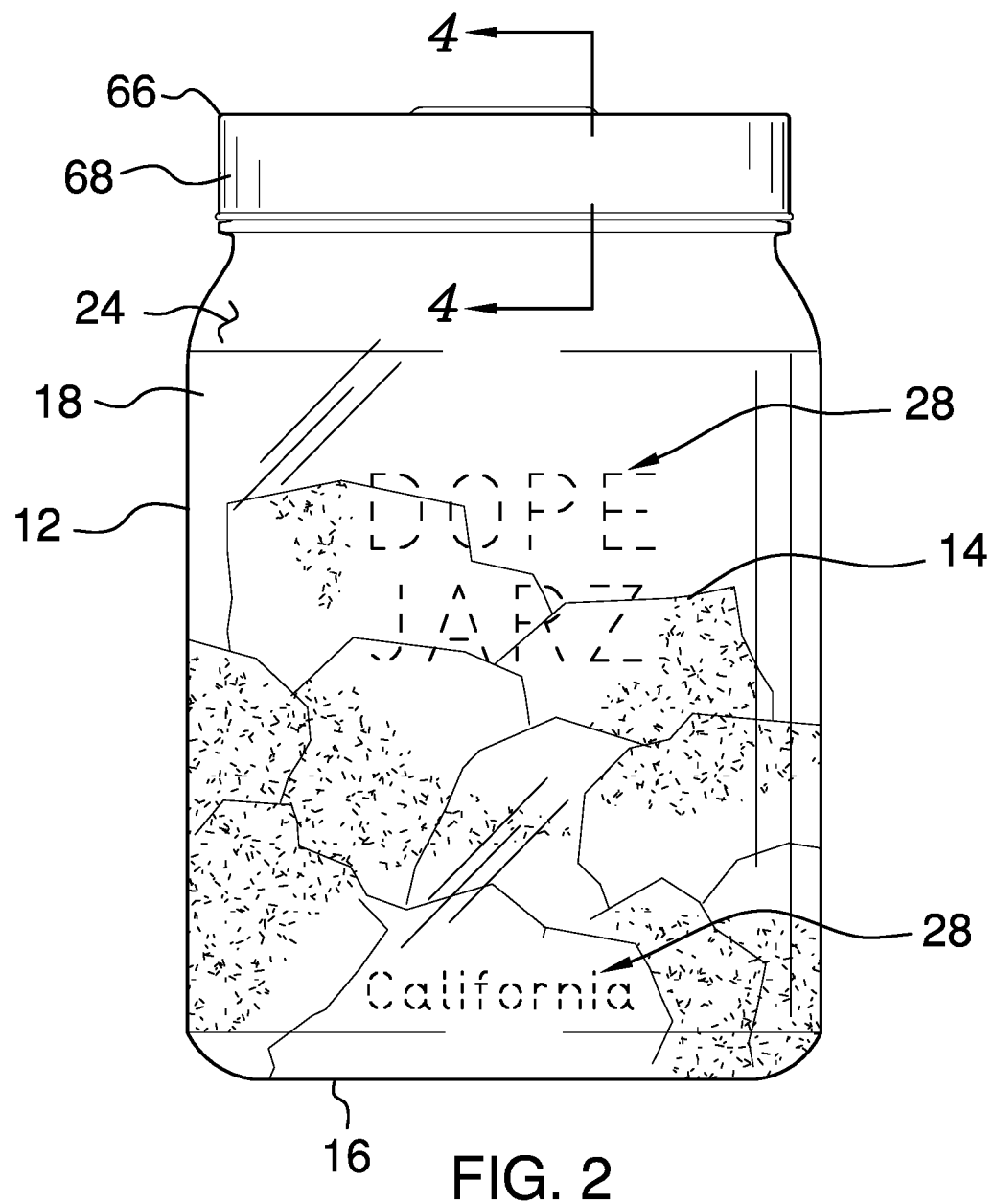
FIG. 2 is a front view of an embodiment of the disclosure.
Figure 3:
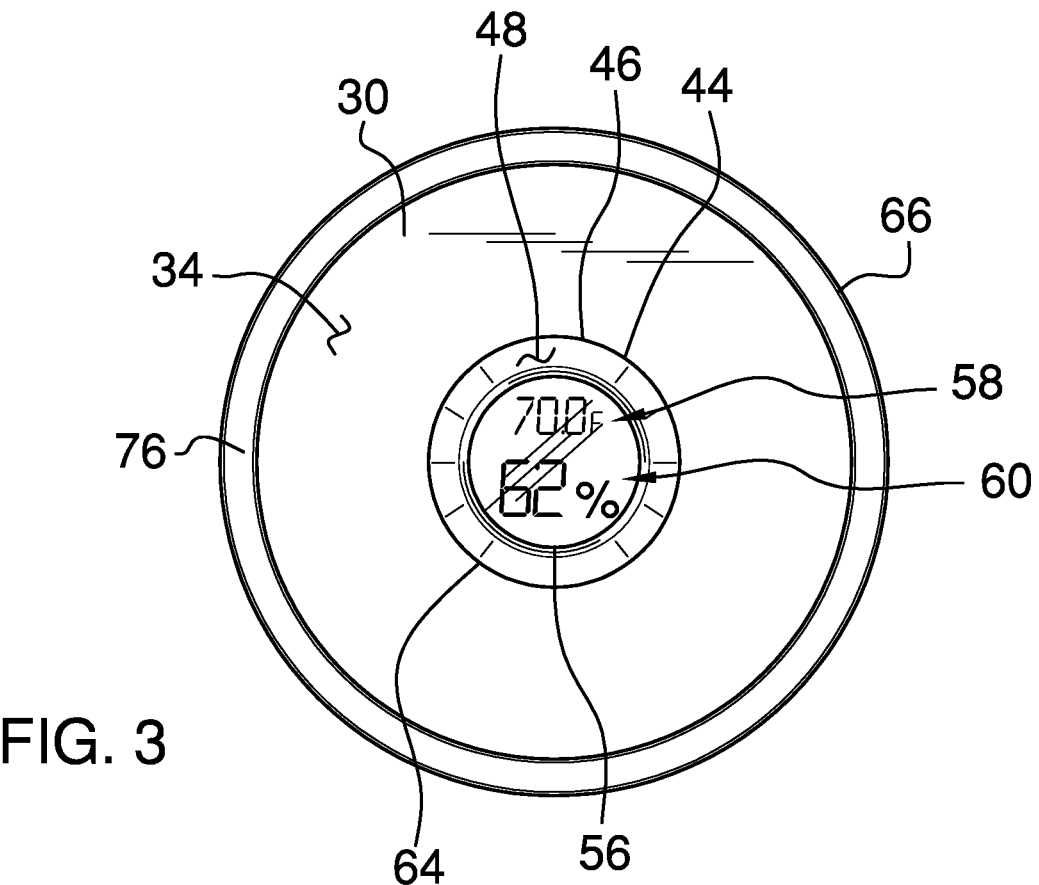
FIG. 3 is a top view of an embodiment of the disclosure.
Figure 4:
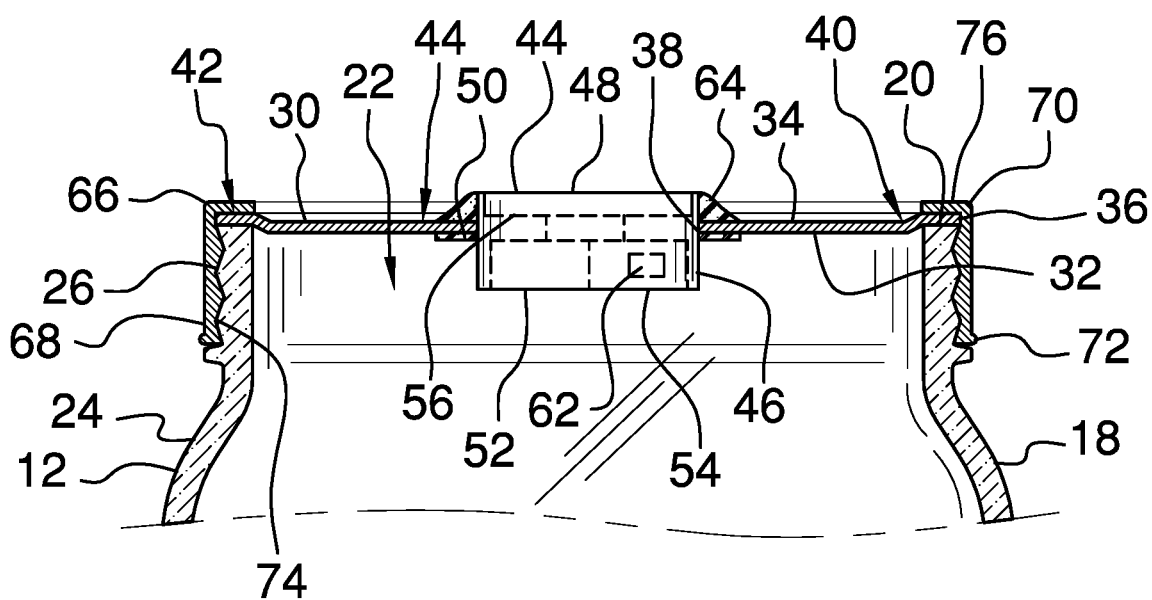
FIG. 4 is a cross sectional view taken along line 4-4 of FIG. 2 of an embodiment of the disclosure.

With reference now to the drawings, and in particular to FIGS. 1 through 5 thereof, a new container device embodying the principles and concepts of an embodiment of the disclosure and generally designated by the reference numeral 10 will be described.

As best illustrated in FIGS. 1 through 5, the environmentally sensitive container assembly 10 generally comprises a jar 12 that has cannabis 14 positioned therein for the purposes of curing the cannabis 14. The jar 12 has a bottom wall 16 and an outer wall 18 extending upwardly therefrom, and the outer wall 18 has a distal edge 20 with respect to the bottom wall 16 defining an opening 22 into the jar 12. The outer wall 18 has an outer surface 24 and the outer surface 24 has a threaded portion 26 adjacent to the distal edge 20. The jar 12 is comprised of a fluid impermeable material such as glass or the like and the outer surface 24 has identifying indicia 28 being printed thereon. The identifying indicia 28 may comprise the words "Dope Jarz" and "California".

A disk 30 is provided and the disk 30 is positionable on the jar 12 for closing the jar 12. The disk 30 has a first surface 32, a second surface 34 and a perimeter edge 36 extending therebetween. The disk 30 has an aperture 38 extending through the first 32 and second 34 surfaces and the aperture 38 is centrally positioned on the disk 30. The first surface 32 rests on the distal edge 20 of the jar 12 when the disk 30 is positioned on the jar 12 and the disk 30 is comprised of a rigid material. The disk 30 has a bend 40 therein that is spaced from and is coextensive with the perimeter edge 36 to define an outer portion 42 of the disk 30 is offset with a central portion 43 of the disk 30. The outer portion 42 lies on the distal edge 20 of the jar 12 when the disk 30 is positioned on the jar 12.

A housing 44 is positioned within the aperture 38 and the housing 44 has an outer surface 46 and an upper surface 48. The outer surface 24 is continuously arcuate such that the housing 44 has a disk shape. Moreover, the outer surface 24 of the housing 44 engages a bounding edge 50 of the aperture 38 having the upper surface 48 being directed upwardly from the disk 30. A humidistat 52 is coupled to the housing 44. The humidistat 52 is in fluid communication with an interior of the jar 12 when the disk 30 is positioned on the jar 12 to detect humidity levels in the jar 12.

A thermometer 54 is coupled to the housing 44 and the thermometer 54 is in thermal communication with the interior of the jar 12 when the disk 30 is positioned on the jar 12 to detect a temperature in the jar 12. A display 56 is coupled to the housing 44 and the display 56 is electrically coupled to each of the humidistat 52 and the thermometer 54. The display 56 displays temperature indicia 58 for communicating the temperature in the interior of the jar 12. Additionally, the display 56 displays humidity indicia 60 for communication the humidity in the interior of the jar 12. The display 56 is positioned on the upper surface 48 of the housing 44 such that the display 56 is visible when the disk 30 is positioned on the jar 12. The humidistat 52 may be an electronic humidistat, the thermometer 54 may be an electronic thermometer and the display 56 may be an LED or the like. A power supply 62 is positioned within the housing 44, the power supply 62 is electrically coupled to the display 56 and the power supply 62 comprises at least one battery.

A gasket 64 extends around the outer surface 24 of the housing 44. The gasket 64 engages the second surface 34 of the disk 30 such that the gasket 64 forms a fluid impermeable seal between the housing 44 and the disk 30. In this way the gasket 64 inhibits fluid communication between the interior of the jar 12 and ambient air when the disk 30 is positioned on the jar 12. The gasket 64 may be comprised of a resiliently compressible and food grade material such as silicone or the like.

A lid 66 is removably coupled to the jar 12 and compresses the disk 30 against the jar 12 to close the jar 12. The lid 66 has an outside wall 68 and the outside wall 68 is continuously arcuate such that the lid 66 forms a closed ring. The outside wall 68 has an upper edge 70, a lower edge 72 and an inwardly facing surface 74 extending therebetween. The inwardly facing surface 74 threadably engages the threaded portion 26 on the outer surface 24 of the outer wall 18 of the jar 12 for removably retaining the lid 66 on the jar 12.

Figure 5:
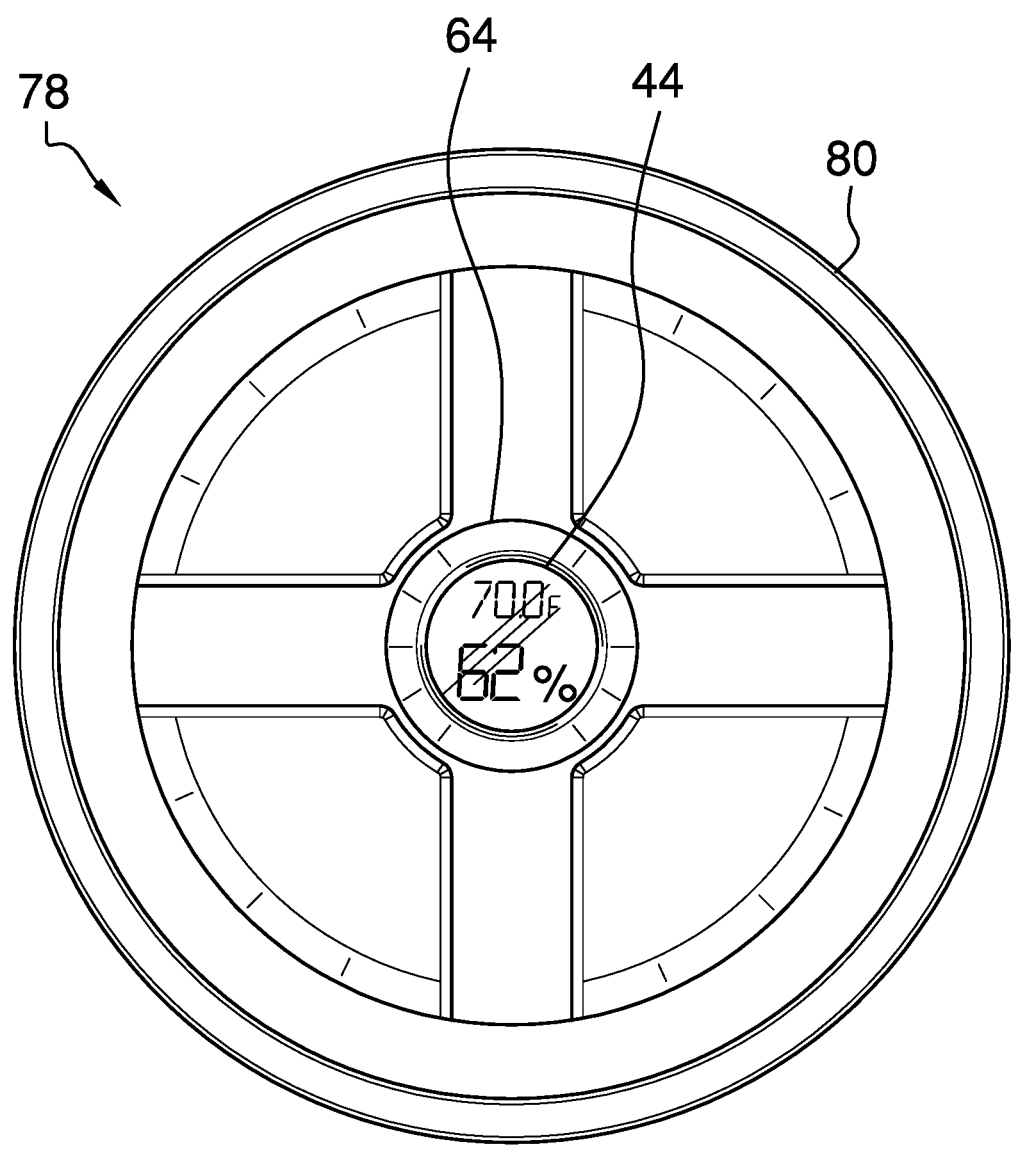
FIG. 5 is a top perspective view of an alternative embodiment of the disclosure.

The lid 66 has a lip 76 extending inwardly from the inwardly facing surface 74 of the outer wall 18 of the lid 66. The lip 76 is aligned with the upper edge 70 of the lid 66 and the lip 76 engages the second surface 34 of the disk 30 when the lid 66 is positioned on the jar 12. In this way the lip 76 compresses the disk 30 against the distal edge 20 of the outer wall 18 of the jar 12. In an alternative embodiment 78 as shown in FIG. 5, each of the housing 44, humidistat 52 and thermometer 54 may be coupled to a gamma seal bucket lid 80 for closing a bucket.

In use, the cannabis 14 is placed in the jar 12 for the purposes of curing the cannabis 14. The disk 30 is positioned on the distal edge 20 of the outer wall 18 of the jar 12 to close the jar 12 and the lid 66 is screwed onto the jar 12. Thus, the disk 30 is compressed against the distal edge 20 of the outer wall 18 of the jar 12 thereby closing the jar 12. The display 56 displays the humidity indicia 60 and the temperature indicia 58 to communicate the humidity and temperature within the jar 12. In this way the process of curing can be externally monitored thereby facilitating a caretaker of the cannabis 14 to know when the cannabis 14 has been properly cured.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An environmentally sensitive container assembly being configured to display atmospheric conditions within assembly for storing and curing cannabis, said assembly comprising:
    a jar having cannabis positioned therein for the purposes of curing the cannabis;
    a disk being positionable on said jar for closing said jar;
    a humidistat being coupled to said disk, said humidistat being in fluid communication with an interior of said jar when said disk is positioned on said jar wherein said humidistat is configured to detect humidity levels in said jar;
    a thermometer being coupled to said disk, said thermometer being in thermal communication with said interior of said jar when said disk is positioned on said jar wherein said thermometer is configured to detect a temperature in said jar;
    a display being coupled to said disk, said display displaying temperature indicia for communicating the temperature in said interior of said jar, said display displaying humidity indicia for communication the humidity in said interior of said jar; and
    a lid being removably coupled to said jar and compressing said disk against said jar to close said jar.

2. The assembly according to claim 1, wherein said jar has a bottom wall and an outer wall extending upwardly therefrom, said outer wall having a distal edge with respect to said bottom wall defining an opening into said jar, said outer wall having an outer surface, said outer surface having a threaded portion adjacent to said distal edge, said jar being comprised of a fluid impermeable material.

3. The assembly according to claim 2, wherein:
    said disk has a first surface, a second surface and a perimeter edge extending therebetween, said disk having an aperture extending through said first and second surfaces, said aperture being centrally positioned on said disk, said first surface resting on said distal edge of said jar when said disk is positioned on said jar;
    said disk being comprised of a rigid material; and
    said disk having a bend therein being spaced from and being coextensive with said perimeter edge to define a outer portion of said disk being offset with a central portion of said disk, said outer portion lying on said distal edge of said jar when said disk is positioned on said jar.

4. The assembly according to claim 3, further comprising a housing being positioned within said aperture, said housing having an outer surface and an upper surface, said outer surface being continuously arcuate such that said housing has a disk shape, said outer surface of said housing engaging a bounding edge of said aperture having said upper surface being directed upwardly from said disk.

5. The assembly according to claim 4, further comprising a gasket extending around said outer surface of said housing, said gasket engaging said second surface of said disk such that said gasket forms a fluid impermeable seal between said housing and said disk to inhibit fluid communication between said interior of said jar and ambient air when said disk is positioned on said jar.

6. The assembly according to claim 3, wherein said lid has an outside wall, said outside wall being continuously arcuate such that said lid forms a closed ring, said outside wall having an upper edge, a lower edge and an inwardly facing surface extending therebetween, said inwardly facing surface threadably engaging said threaded portion on said outer surface of said outer wall of said jar for removably retaining said lid on said jar.

7. The assembly according to claim 6, wherein said lid has a lip extending inwardly from said inwardly facing surface of said outer wall of said lid, said lip being aligned with said upper edge of said lid, said lip engaging said second surface of said disk when said lid is positioned on said jar for compressing said disk against said distal edge of said outer wall of said jar.

8. An environmentally sensitive container assembly being configured to display atmospheric conditions within assembly for storing and curing cannabis, said assembly comprising:

a jar having cannabis positioned therein for the purposes of curing the cannabis, said jar having a bottom wall and an outer wall extending upwardly therefrom, said outer wall having a distal edge with respect to said bottom wall defining an opening into said jar, said outer wall having an outer surface, said outer surface having a threaded portion adjacent to said distal edge, said jar being comprised of a fluid impermeable material;

a disk being positionable on said jar for closing said jar, said disk having a first surface, a second surface and a perimeter edge extending therebetween, said disk having an aperture extending through said first and second surfaces, said aperture being centrally positioned on said disk, said first surface resting on said distal edge of said jar when said disk is positioned on said jar, said disk being comprised of a rigid material, said disk having a bend therein being spaced from and being coextensive with said perimeter edge to define a outer portion of said disk being offset with a central portion of said disk, said outer portion lying on said distal edge of said jar when said disk is positioned on said jar;

a housing being positioned within said aperture, said housing having an outer surface and an upper surface, said outer surface being continuously arcuate such that said housing has a disk shape, said outer surface of said housing engaging a bounding edge of said aperture having said upper surface being directed upwardly from said disk;

a humidistat being coupled to said housing, said humidistat being in fluid communication with an interior of said jar when said disk is positioned on said jar wherein said humidistat is configured to detect humidity levels in said jar;

a thermometer being coupled to said housing, said thermometer being in thermal communication with said interior of said jar when said disk is positioned on said jar wherein said thermometer is configured to detect a temperature in said jar;

a display being coupled to said housing, said display being electrically coupled to each of said humidistat and said thermometer, said display displaying temperature indicia for communicating the temperature in said interior of said jar, said display displaying humidity indicia for communication the humidity in said interior of said jar, said display being positioned on said upper surface of said housing wherein said display is configured to be visible when said disk is positioned on said jar;

a gasket extending around said outer surface of said housing, said gasket engaging said second surface of said disk such that said gasket forms a fluid impermeable seal between said housing and said disk to inhibit fluid communication between said interior of said jar and ambient air when said disk is positioned on said jar; and a lid being removably coupled to said jar and compressing said disk against said jar to close said jar, said lid having an outside wall, said outside wall being continuously arcuate such that said lid forms a closed ring, said outside wall having an upper edge, a lower edge and an inwardly facing surface extending therebetween, said inwardly facing surface threadably engaging said threaded portion on said outer surface of said outer wall of said jar for removably retaining said lid on said jar, said lid having a lip extending inwardly from said inwardly facing surface of said outer wall of said lid, said lip being aligned with said upper edge of said lid, said lip engaging said second surface of said disk when said lid is positioned on said jar for compressing said disk against said distal edge of said outer wall of said jar.

* * * * *